US011167704B2

(12) United States Patent
Nunokawa (10) Patent No.: US 11,167,704 B2
(45) Date of Patent: Nov. 9, 2021

(54) ELECTRIC POWER SYSTEM FOR VEHICLE, ELECTRIC POWER CONTROL APPARATUS FOR VEHICLE, METHOD OF CONTROLLING ELECTRIC POWER OF VEHICLE, AND COMPUTER-READABLE RECORDING MEDIUM CONTAINING PROGRAM

(71) Applicant: SUBARU CORPORATION, Tokyo (JP)

(72) Inventor: Takumi Nunokawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/736,415

(22) Filed: Jan. 7, 2020

(65) Prior Publication Data
US 2020/0298776 A1    Sep. 24, 2020

(30) Foreign Application Priority Data
Mar. 19, 2019 (JP) .............................. JP2019-051734

(51) Int. Cl.
*B60R 16/04* (2006.01)
*B60R 16/033* (2006.01)
*F02G 5/02* (2006.01)
*B60R 16/03* (2006.01)

(52) U.S. Cl.
CPC ............ *B60R 16/04* (2013.01); *B60R 16/033* (2013.01); *B60R 16/0307* (2013.01); *F02G 5/02* (2013.01)

(58) Field of Classification Search
CPC ...... B60L 1/00; B60L 1/003; B60L 50/10–16; B60L 50/90; B60R 16/03; B60R 16/0307; B60R 16/033; B60R 16/04; F02G 5/02; Y02E 20/14
See application file for complete search history.

(56) References Cited

U.S. PATENT DOCUMENTS

| 6,949,841 B1* | 9/2005 | Cailleux | ................. B60L 58/12 |
|  |  |  | 290/40 C |
| 2006/0097577 A1* | 5/2006 | Kato | ................... F02N 11/0866 |
|  |  |  | 307/10.1 |

(Continued)

FOREIGN PATENT DOCUMENTS

JP    2004-222461 A    8/2004

*Primary Examiner* — Levi Gannon
(74) *Attorney, Agent, or Firm* — McDermott Will & Emery LLP (57) ABSTRACT

An electric power system for a vehicle includes an exhaust heat recovery apparatus, a low-voltage system, a high-voltage system, a first wiring line, a second wiring line, and a DC/DC converter. The exhaust heat recovery apparatus includes a power generator that generates electric power on the basis of heat exhausted from a heating element. The low-voltage system includes a low-voltage secondary battery. The high-voltage system includes a high-voltage secondary battery that outputs a voltage higher than the low-voltage secondary battery. The first wiring line couples the power generator and the low-voltage system. The second wiring line couples the first wiring line and the high-voltage system. The DC/DC converter is disposed on the second wiring line and increases and decreases a voltage supplied to the DC/DC converter.

17 Claims, 4 Drawing Sheets

(56) References Cited

U.S. PATENT DOCUMENTS

| | | | |
|---|---|---|---|
| 2008/0223632 A1* | 9/2008 | Bartilson | B60K 6/46 180/65.265 |
| 2012/0073295 A1* | 3/2012 | Enokijima | F01K 23/065 60/660 |
| 2018/0257480 A1* | 9/2018 | Zhou | B60K 6/365 |

* cited by examiner

ELECTRIC POWER SYSTEM FOR VEHICLE, ELECTRIC POWER CONTROL APPARATUS FOR VEHICLE, METHOD OF CONTROLLING ELECTRIC POWER OF VEHICLE, AND COMPUTER-READABLE RECORDING MEDIUM CONTAINING PROGRAM

CROSS-REFERENCE TO RELATED APPLICATIONS

The present application claims priority from Japanese Patent Application No. 2019-051734 filed on Mar. 19, 2019, the entire contents of which are hereby incorporated by reference.

BACKGROUND

1. Technical Field

The disclosure relates to an electric power system for a vehicle, an electric power control apparatus for the vehicle, a method of controlling electric power of the vehicle, and a computer-readable recording medium containing a program.

2. Related Art

An electric power system for a vehicle is known that includes an exhaust heat recovery apparatus. The exhaust heat recovery apparatus includes a power generator that generates electric power from heat exhausted from a heating element. For example, Japanese Unexamined Patent Application Publication (JP-A) No. 2004-222461 discloses a hybrid vehicle provided with an exhaust energy recovery apparatus that collects exhaust energy of an internal combustion engine. The exhaust energy recovery apparatus is coupled to a low-voltage battery via an inverter. The electric load of the inverter is controlled so that a target amount of electric power is obtained by the exhaust energy recovery apparatus. Additionally, a motor generator serving as a driving source of the vehicle is also coupled to a high-voltage battery via another inverter. The low-voltage battery and high-voltage battery are coupled to each other via a DC/DC converter. The DC/DC converter controls transmission of electric power between the low-voltage battery and the high-voltage battery.

SUMMARY

An aspect of the technology provides an electric power system for a vehicle. The system includes an exhaust heat recovery apparatus, a low-voltage system, a high-voltage system, a first wiring line, a second wiring line, and a DC/DC converter. The exhaust heat recovery apparatus includes a power generator configured to generate electric power on the basis of heat exhausted from a heating element. The low-voltage system includes a low-voltage secondary battery. The high-voltage system includes a high-voltage secondary battery configured to output a voltage higher than the low-voltage secondary battery. The first wiring line couples the power generator and the low-voltage system. The second wiring line couples the first wiring line and the high-voltage system. The DC/DC converter is disposed on the second wiring line and configured to increase and decrease a voltage supplied to the DC/DC converter.

An aspect of the technology provides an electric power control apparatus for a vehicle. The vehicle includes a heating element, an exhaust heat recovery apparatus, a low-voltage system, a high-voltage system, a first wiring line, a second wiring line, and a DC/DC converter. The exhaust heat recovery apparatus includes a power generator configured to generate electric power on the basis of heat exhausted from the heating element. The low-voltage system includes a low-voltage secondary battery. The high-voltage system includes a high-voltage secondary battery configured to output a voltage higher than the low-voltage secondary battery. The first wiring line couples the power generator and the low-voltage system. The second wiring line couples the first wiring line and the high-voltage system. The DC/DC converter is disposed on the second wiring line and configured to increase and decrease a voltage supplied to the DC/DC converter. The electric power control apparatus is configured to control an output current of the power generator by controlling the DC/DC converter.

An aspect of the technology provides a method of controlling electric power of a vehicle. The method includes: preparing the vehicle that includes a heating element, an exhaust heat recovery apparatus including a power generator configured to generate electric power on the basis of heat exhausted from the heating element, a low-voltage system including a low-voltage secondary battery, a high-voltage system including a high-voltage secondary battery configured to output a voltage higher than the low-voltage secondary battery, a first wiring line coupling the power generator and the low-voltage system, a second wiring line coupling the first wiring line and the high-voltage system, and a DC/DC converter disposed on the second wiring line and configured to increase and decrease a voltage supplied to the DC/DC converter; and controlling, with an electric power control apparatus for the vehicle, an output current of the power generator by controlling the DC/DC converter.

An aspect of the technology provides a non-transitory computer-readable recording medium containing a program. The program causes, when executed by a computer, the computer to implement a method of controlling electric power of a vehicle. The vehicle includes a heating element, an exhaust heat recovery apparatus, a low-voltage system, a high-voltage system, a first wiring line, a second wiring line, and a DC/DC converter. The exhaust heat recovery apparatus includes a power generator configured to generate electric power on the basis of heat exhausted from a heating element. The low-voltage system includes a low-voltage secondary battery. The high-voltage system includes a high-voltage secondary battery configured to output a voltage higher than the low-voltage secondary battery. The first wiring line couples the power generator and the low-voltage system. The second wiring line couples the first wiring line and the high-voltage system. The DC/DC converter is disposed on the second wiring line and configured to increase and decrease a voltage supplied to the DC/DC converter. The method includes controlling, with an electric power control apparatus for the vehicle, an output current of the power generator by controlling the DC/DC converter.

An aspect of the technology provides an electric power control apparatus for a vehicle. The vehicle includes a heating element, an exhaust heat recovery apparatus, a low-voltage system, a high-voltage system, a first wiring line, a second wiring line, and a DC/DC converter. The exhaust heat recovery apparatus includes a power generator configured to generate electric power on the basis of heat exhausted from a heating element. The low-voltage system includes a low-voltage secondary battery. The high-voltage system includes a high-voltage secondary battery configured to output a voltage higher than the low-voltage secondary battery. The first wiring line couples the power generator and the low-voltage system. The second wiring line couples the first wiring line and the high-voltage system. The DC/DC converter is disposed on the second wiring line and configured to increase or decrease a voltage supplied to the DC/DC converter. The electric power control apparatus includes circuitry configured to control an output current of the power generator by controlling the DC/DC converter.

BRIEF DESCRIPTION OF THE DRAWINGS

The accompanying drawings are included to provide a further understanding of the technology and are incorporated in and constitute a part of this specification. The drawings illustrate exemplary embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

The electric power system disclosed in JP-A No. 2004-222461 includes two electric power converters as separate components: One of the electric power converters is the inverter that controls power generation of the exhaust energy recovery apparatus, and the other is the DC/DC converter that controls transmission of electric power between the low-voltage battery and the high-voltage battery. Such an increase in the number of electric power converters can increase the size of the electric power system, which can consume the space in the vehicle. Accordingly, there is a demand for a compact electric power system that makes it possible to control power generation for collecting electric power from exhaust heat.

It is desirable to provide a compact electric power system, a method, and a computer-readable recording medium containing a program that makes it possible to control power generation for collecting electric power from exhaust heat and transmit electric power between a low-voltage system and a high-voltage system in a vehicle.

[Configuration of Electric Power System]

Figure 1:
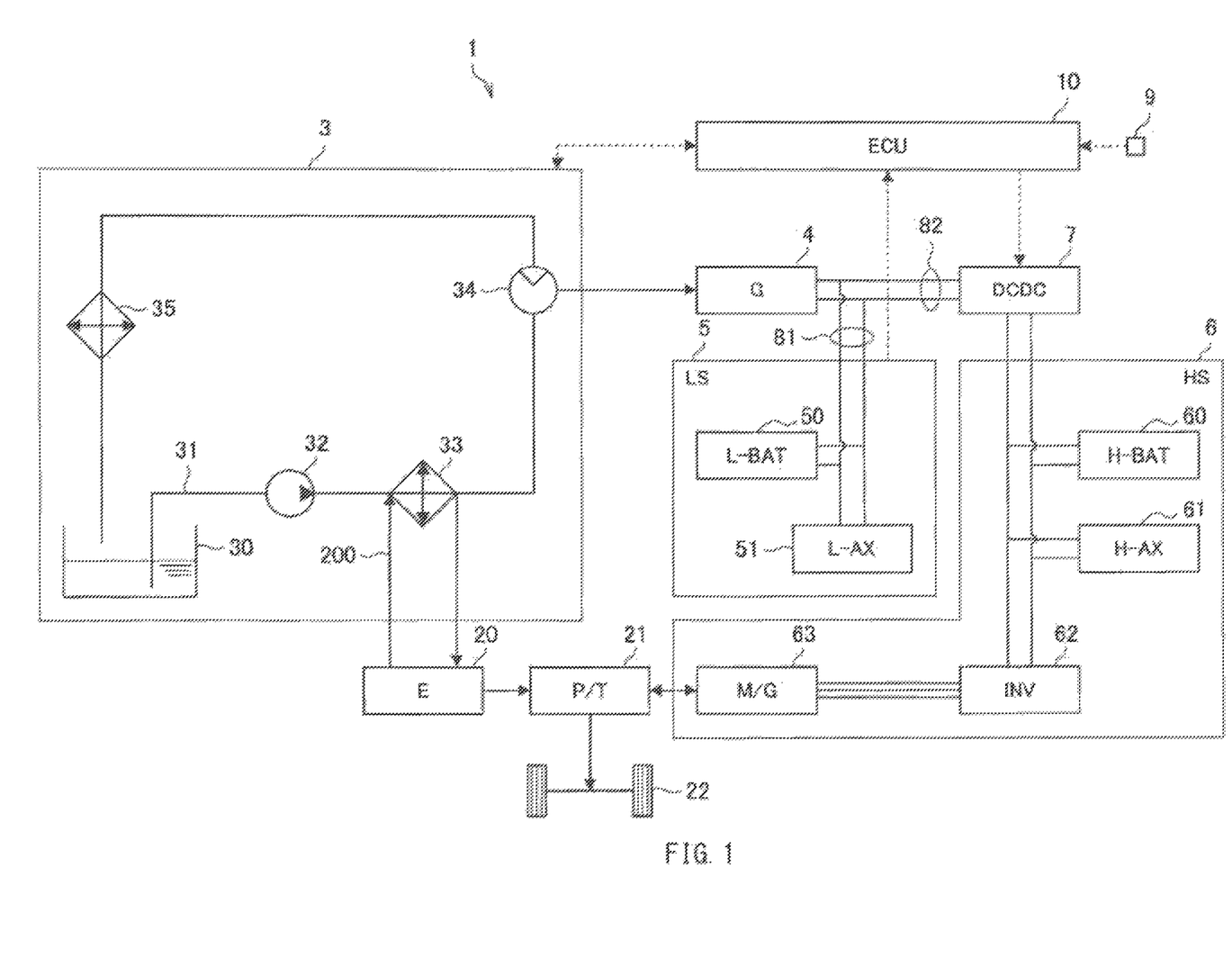
FIG. 1 is a diagram illustrating exemplary outline configurations of systems in a vehicle according to one example embodiment of the technology.
Figure 2:
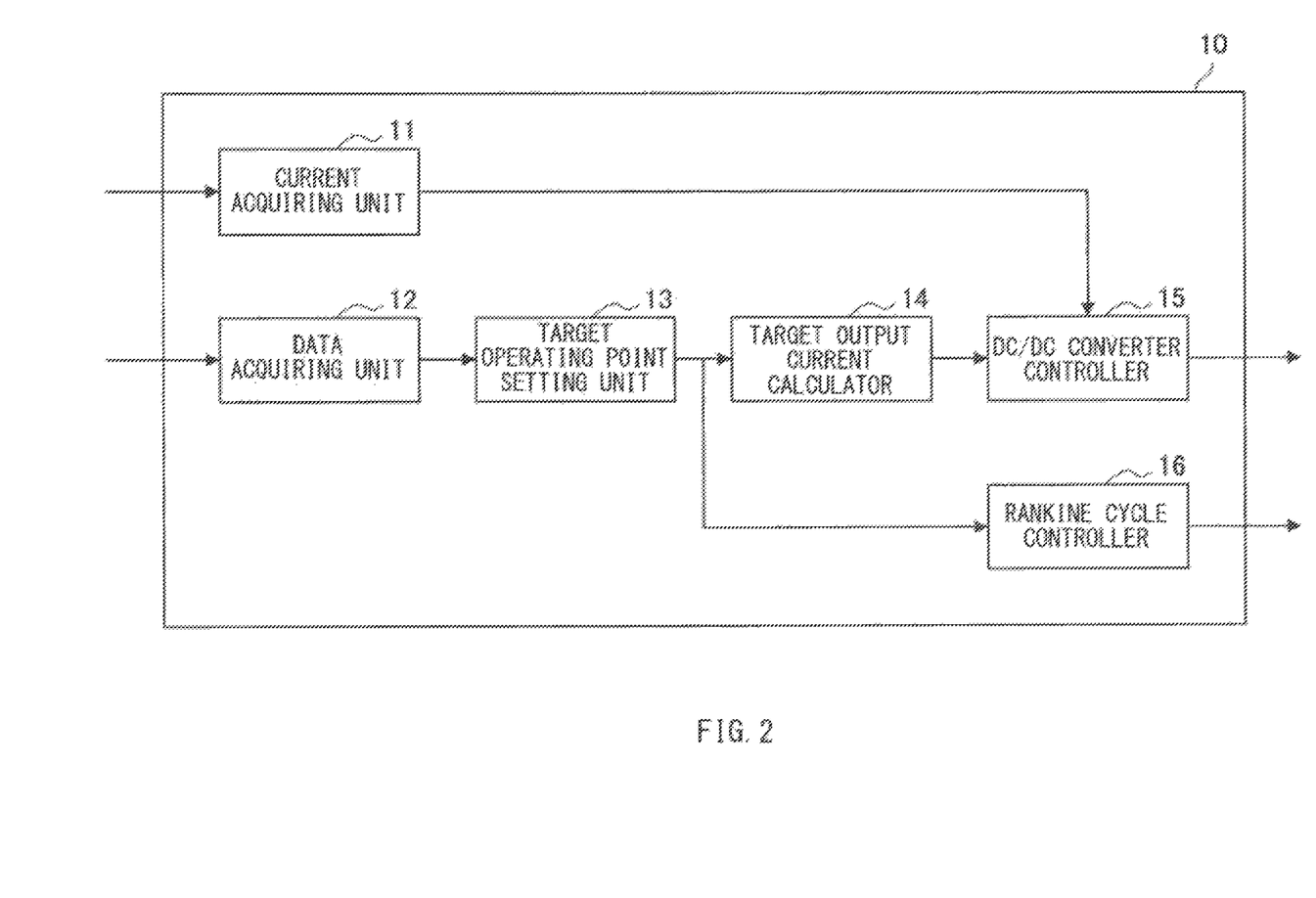
FIG. 2 is a block diagram illustrating an exemplary outline configuration of an electric power control apparatus for the vehicle according to one example embodiment of the technology.

Exemplary outline configurations of an electric power system for a vehicle, an electric power control apparatus for the vehicle, and a computer-readable recording medium containing a program for the vehicle according to an embodiment of the technology will now be described with reference to FIGS. 1 to 3. As illustrated in FIG. 1, the vehicle may be, for example, a hybrid electric vehicle (HEV) that includes a driving system, an electric power system 1, and a control system. The control system may include a sensor 9 of various types and an electronic control unit (ECU) 10. The ECU 10 may receive a signal from the sensor 9, the driving system, and the electric power system 1, and output a control signal to the driving system and the electric power system 1. The ECU 10 may thereby control driving force and electric power of the vehicle. Alternatively, the vehicle may be an electric vehicle (EV).

The driving system for the vehicle may include an engine 20, a powertrain 21, driving wheels 22, and a motor generator 63. The engine 20 may be an internal combustion engine, such as a gasoline engine. The engine 20 may run and stop in accordance with a traveling state, such as a required torque, of the vehicle. Motive power generated by the running of the engine 20 may be transmitted to the driving wheels 22 via the powertrain 21. The powertrain 21 may include, for example, a power divider including a planetary gear mechanism, a reduction gear, or a differential gear. The motor generator 63 may serve as a driving motor that generates driving force of the vehicle. The motor generator 63 may also serve as a power generator that generates electric power from kinetic energy of the vehicle during braking of the vehicle. The motor generator 63 may be a three-phase motor generator, for example. The motor generator 63 may be electrically coupled to a high-voltage battery 60 via an inverter 62.

When the motor generator 63 serves as the driving motor, the inverter 62 may convert direct-current (DC) power fed from the high-voltage battery 60 into alternating-current (AC) power, and the AC power may be fed from the inverter 62 to the motor generator 63. Motive power generated at the motor generator 63 may be transmitted to the driving wheels 22 via the powertrain 21. The ECU 10 may control the motive power generated at the motor generator 63 by controlling the inverter 62. When the motor generator 63 serves as the power generator, the ECU 10 may cause the motor generator 63 to generate electric power from the rotational energy of the driving wheels 22 by controlling the inverter 62. AC power generated may be converted into DC power at the inverter 62, and the DC power may be stored in the high-voltage battery 60. This imparts resistance to the rotation of the driving wheels 22, generating braking force. The ECU 10 may control electric power generation at the motor generator 63 by controlling the inverter 62.

The electric power system 1 for the vehicle includes a Rankine cycle 3, a power generator 4, a low-voltage system 5, a high-voltage system 6, a DC/DC converter 7, a first wiring line 81, and a second wiring line 82. In one embodiment, the engine 20 may serve as a "heating element" that supplies exhaust heat to the Rankine cycle 3. The engine 20 may have a cylinder block or a cylinder head provided with a cooling water passage 200 in which cooling water circulates. Heat exhausted from the engine 20 may be collected by the cooling water circulating in the cooling water passage 200. The cooling water passage 200 may be coupled to a heat exchanger 33 of the Rankine cycle 3 disposed outside the engine 20. The cooling water passage 200 may exchange heat with a working medium in the Rankine cycle 3 at the heat exchanger 33.

In one embodiment, the Rankine cycle 3 and the power generator 4 may serve as an "exhaust heat recovery apparatus". The Rankine cycle 3 and the power generator 4 may generate electric power from heat exhausted from the engine 20. The Rankine cycle 3 may be a cycle in which the working medium undergoes a phase change, and may generate motive power for the power generator 4 on the basis of the flow of the working medium. The Rankine cycle 3 may include a tank 30, a working medium passage 31, a pump 32, the heat exchanger 33, an expander 34, and a condenser 35. The working medium passage 31 may be a passage in which the working medium circulates. Examples of the working medium may include water, chlorofluorocarbon, and alcohol. The pump 32 may pump up the working medium stored in the tank 30 and compress the working medium. The pump 32 may be driven by an electric motor, for example. The electric motor may be driven by the ECU 10. The number of rotations of the pump 32 may be controlled on the basis of a command from the ECU 10.

The heat exchanger 33 may be coupled to the working medium passage 31 and the cooling water passage 200. At the heat exchanger 33, heat may be exchanged between the working medium flowing from the pump 32 and the cooling water flowing in the cooling water passage 200. In this way, the working medium may be heated and vaporized by the cooling water carrying the exhaust heat of the engine 20. The heat exchanger 33 may serve as an evaporator. Alternatively, the working medium may be heated by exhaust gas carrying the heat exhausted from the engine 20. The expander 34 may be disposed in the working medium passage 31. The expander 34 may expand the working medium vaporized at the heat exchanger 33 to generate rotational energy. For example, the expander 34 may have an expansion chamber and a turbine. The working medium may be taken into the expansion chamber and expanded in the expansion chamber. The turbine may rotate when the working medium flows into the turbine, generating motive power and rotational energy. The condenser 35 may be disposed in the working medium passage 31. For example, the condenser 35 may be disposed in front of a radiator in an engine room. The condenser 35 may cool and condense the working medium in a gas phase having passed through the expander 34 by taking in external air using a fan, for example. The condensed working medium may be stored in the tank 30.

The power generator 4 may generate electric power from motive power generated by the Rankine cycle 3. The power generator 4 may have a rotary shaft connectable to the turbine of the expander 34, and generate electric power from the rotational energy transmitted from the expander 34 through the rotary shaft. The power generator 4 may be a general alternator that includes, for example, a rotor, a stator, a rectifier, and a voltage regulator. The rotor may have magnetic poles and a rotor coil, and rotate integrally with the rotary shaft. The stator may be disposed on the outer periphery of the rotor and include a three-phase stator coil. The rectifier may rectify and convert a three-phase AC voltage generated at the stator into a DC voltage. The voltage regulator may be an IC voltage regulator, for example. The voltage regulator may control an electric current flowing in the rotor coil to maintain the DC voltage outputted from the power generator 4 at a predetermined constant level.

The low-voltage system 5 may include a low-voltage battery 50 and a low-voltage auxiliary device 51. The low-voltage battery 50 may be a low-voltage secondary battery having a voltage of, for example but not limited to, 12 volts. The low-voltage auxiliary device 51 may be driven at a relatively low voltage. Examples of the low-voltage auxiliary device 51 may include a radiator fan, a car navigation device, various kinds of ECUs, an ignition coil, and other electric components.

The high-voltage system 6 may include a high-voltage battery 60, a high-voltage auxiliary device 61, the inverter 62, and the motor generator 63. The high-voltage system 6 may be a voltage system relevant to driving of the vehicle, for example. The high-voltage battery 60 may be a high-voltage secondary battery having a voltage of, for example but not limited to, 200 volts. The voltage of the high-voltage battery 60 may be set to any value higher than the voltage of the low-voltage battery 50. The high-voltage auxiliary device 61 may be driven at a relatively high voltage. Examples of the high-voltage auxiliary device 61 may include a motor of an electric power steering system.

The DC/DC converter 7 may be a voltage converter that converts a direct current from one voltage level to another. The DC/DC converter 7 may be bi-directionally operatable. In other words, the DC/DC converter 7 may be configured to increase and decrease a direct voltage. The first wiring line 81 and the second wiring line 82 may transmit electricity. The first wiring line 81 may electrically couple the power generator 4 to the low-voltage system. The low-voltage battery 50 and the low-voltage auxiliary device 51 may be coupled in parallel to the first wiring line 81. The second wiring line 82 may electrically couple the first wiring line 81 to the high-voltage system 6. In other words, the second wiring line 82 may branch from the first wiring line 81 and be coupled to the high-voltage system 6. The high-voltage battery 60, the high-voltage auxiliary device 61, and the inverter 62 may be coupled in parallel to the second wiring line 82. The DC/DC converter 7 may be disposed on the second wiring line 82. In other words, the DC/DC converter 7 may be disposed between the high-voltage system 6 and the node between the first wiring line 81 and the wiring line coupling the power generator 4 to the high-voltage system 6. In still other words, the low-voltage system 5 and the high-voltage system 6 may be coupled in parallel to the power generator 4, and the DC/DC converter 7 disposed between the low-voltage system 5 and the high-voltage system 6 may be disposed on the wiring line that couples the power generator 4 and the high-voltage system 6.

The sensor 9 in the control system for the vehicle may include a sensor that detects the temperature of the cooling water for the engine 20 and a sensor that detects the temperature of external air outside the vehicle, for example. The entirety or part of the ECU 10 may be configured by, for example, a microcomputer or a microprocessor unit. For example, the microcomputer may include a central processing unit (CPU) that executes various arithmetic processing, a read-only memory (ROM) that stores various control programs, a random access memory (RAM) that is used as a working area in which data is stored and programs are executed, and input/output interface (I/O). The microcomputer may have a general configuration in which these components are coupled to one another via a bi-directional common bus. Optionally, the ECU 10 may be coupled to another ECU via a communication line such as a controller area network (CAN) to mutually transmit control data or various pieces of data on a target to be controlled (e.g., a vehicle speed, the torque of the engine 20, and the number of revolutions of the engine 20). For example, the ECU 10 may receive a sensor signal from the pump 32 in the Rankine cycle 3 and the motor generator 63 in the high-voltage system 6, and output a control signal to the pump 32 in the Rankine cycle 3 and the inverter 62 in the high-voltage system 6. Additionally, the ECU 10 may receive a signal indicative of a consumption current of the low-voltage system 5 (e.g., a value detected by a current sensor in the low-voltage system 5) from the low-voltage system 5. Further, the ECU 10 may output a control signal to the DC/DC converter 7. Optionally, the ECU 10 may include a voltage regulator for the power generator 4. Alternatively, the ECU 10 may be a separate component from an ECU that controls the driving system of the vehicle.

[Outline Configuration of ECU]

In the following description, an exemplary configuration of the ECU 10 according to an embodiment is described with reference to FIGS. 2 and 3. As illustrated in FIG. 2, the ECU 10 may include functional components including a current acquiring unit 11, a data acquiring unit 12, a target operating point setting unit 13, a target output current calculator 14, a DC/DC converter controller 15, and a Rankine cycle controller 16. In one embodiment, the current acquiring unit 11, the data acquiring unit 12, the target operating point setting unit 13, the target output current calculator 14, and the DC/DC converter controller 15 may serve as an "electric power control apparatus" for the vehicle.

The current acquiring unit 11 may acquire (e.g., detect or estimate (the same is applied to the following description)) a consumption current of the low-voltage system 5 on the basis of a signal received from the low-voltage system 5. For example, the current acquiring unit 11 may be configured to estimate a consumption current of the low-voltage system 5 at a predetermined future point from the changing rate of a detection value received from the current sensor of the low-voltage system 5, for example.

The data acquiring unit 12 may acquire data on the Rankine cycle 3 on the basis of a signal received from the sensor 9 and the Rankine cycle 3, for example. The data on the Rankine cycle 3 may include one or both of data on the amount of heat generated at the engine 20 (i.e., the amount of heat exhaust from the engine 20) and data on the amount of the phase change of the working medium in the Rankine cycle 3. The data on the amount of heat generated at the engine 20 may be a parameter indicative of the driving state of the engine 20. The parameter may include one or both of the temperature of the cooling water for the engine 20 and the load (e.g., torque or number of revolutions) of the engine 20. The data on the amount of the phase change of the working medium may be a parameter that defines the amount of a working medium to be condensed at the condenser 35, for example. The parameter may include any or all of the temperature of the working medium, the external air temperature, and the velocity of the airflow passing through the condenser 35. One reason for this is that the amount of the working medium to be condensed at the condenser 35 is in proportion to the volume of the cooling air for cooling the working medium, and the volume of the cooling air is determined by multiplying the velocity of the airflow passing through the condenser 35 by the area of the condenser 35. Examples of the velocity of the airflow passing through the condenser 35 may include a vehicle speed and a radiator airflow rate. Additionally, the data acquiring unit 12 may estimate data on the Rankine cycle 3 at a predetermined future point from the changing rate of the parameters described above.

The target operating point setting unit 13 may set a target operating point of the Rankine cycle 3 on the basis of the data received from the data acquiring unit 12. For example, the target operating point setting unit 13 may set a target operating point of the Rankine cycle 3 at which larger motive power is obtained from the heat exhausted from the engine 20 and greater electric power is thus generated with higher efficiency. For example, the target operating point setting unit 13 may calculate, on the basis of the data on the amount of heat generated at the engine 20 and the data on the amount of the phase change of the working medium acquired by the data acquiring unit 12, target operating points of the pump 32, the expander 34, and other components at which the Rankine cycle 3 approaches a higher efficiency point and a maximum efficiency point.

The target output current calculator 14 may calculate a target output current of the power generator 4 on the basis of the data received from the target operating point setting unit 13. For example, the target output current calculator 14 may calculate a target torque of the power generator 4 on the basis of the target operating point of the expander 34 in the Rankine cycle 3 (i.e., a target load of the power generator 4) and calculate a target output current of the power generator 4 on the basis of the target torque. For instance, the target output current calculator 14 may calculate a target output current of the power generator 4 that allows the Rankine cycle 3 to approach a maximum efficiency point at the time or an estimated maximum efficiency point at a near future point as soon as possible. Alternatively, the target output current calculator 14 may calculate the target output current of the power generator 4 directly from the target operating point of the Rankine cycle 3 using a table, for example, without calculating the target torque of the power generator 4.

On the basis of the data received from the current acquiring unit 11 and the target output current calculator 14, the DC/DC converter controller 15 may output a control signal to the DC/DC converter 7 to control the operation of the DC/DC converter 7. For example, the DC/DC converter controller 15 may control the DC/DC converter 7 to cause the sum of the acquired consumption current of the low-voltage system 5 and the output current outputted from the DC/DC converter 7 to the high-voltage system 6 to become equal to the calculated target output current of the power generator 4. The wording "the output current outputted from the DC/DC converter 7 to the high-voltage system 6" may refer to the value of a current outputted from the DC/DC converter 7 to the high-voltage system 6. In contrast, when the DC/DC converter 7 outputs a current to the low-voltage system 5, "the output current outputted from the DC/DC converter 7 to the high-voltage system 6" may take a negative value. In this case, the DC/DC converter controller 15 may control the DC/DC converter 7 to cause the difference obtained by subtracting the current outputted from the DC/DC converter 7 to the low-voltage system 5 from the acquired consumption current of the low-voltage system 5 to become equal to the calculated target output current of the power generator 4.

The Rankine cycle controller 16 may output a control signal to the Rankine cycle 3 on the basis of the data received from the target operating point setting unit 13 to cause the Rankine cycle 3 to operate at the target operating point. For example, the Rankine cycle controller 16 may control operations of the components in the Rankine cycle 3 including the pump 32. Alternatively, the Rankine cycle controller 16 may be disposed in another ECU than the ECU that includes the current acquiring unit 11, the data acquiring unit 12, the target operating point setting unit 13, the target output current calculator 14, and the DC/DC converter controller 15.

Figure 3:
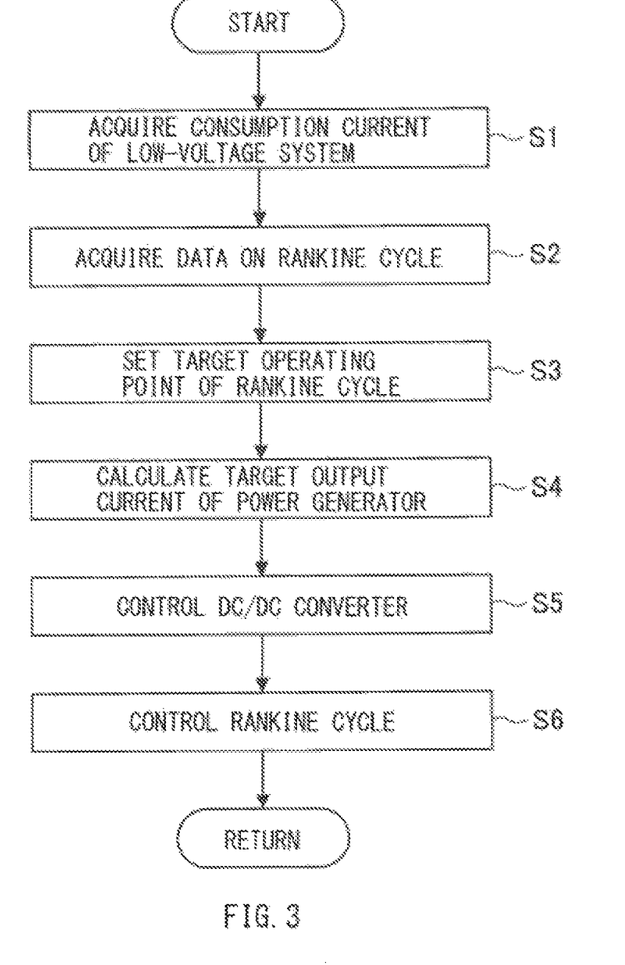
FIG. 3 is a flowchart illustrating an exemplary process of controlling electric power of the vehicle according to one example embodiment of the technology.

FIG. 3 is a flowchart of exemplary electric power control executed by the ECU 10. The control may be executed repeatedly in a predetermined cycle. The control may be executed by a program that causes the ECU 10 as a computer to serve as an electric power control apparatus that controls an output current of the power generator 4. In Step S1, the current acquiring unit 11 may acquire a consumption current of the low-voltage system 5. In Step S2, the data acquiring unit 12 may acquire data on the Rankine cycle 3. In Step S3, the target operating point setting unit 13 may set a target operating point of the Rankine cycle 3. In Step S4, the target output current calculator 14 may calculate a target output current of the power generator 4. In Step S5, the DC/DC converter controller 15 may control the operation of the DC/DC converter 7. In Step S6, the Rankine cycle controller 16 may control the operation of the Rankine cycle 3. Note that Step S1 may be performed at any timing before Step S5. For example, Step S1 may be performed after any of Steps S2 to S4 or concurrently with any of Steps S2 to S4. Step S6 may be performed at any timing after Step S3. For example, Step S6 may be performed before any of Steps S4 and S5 or concurrently with any of Steps S4 and S5.

[Operation of Electric Power System]

Figure 4:
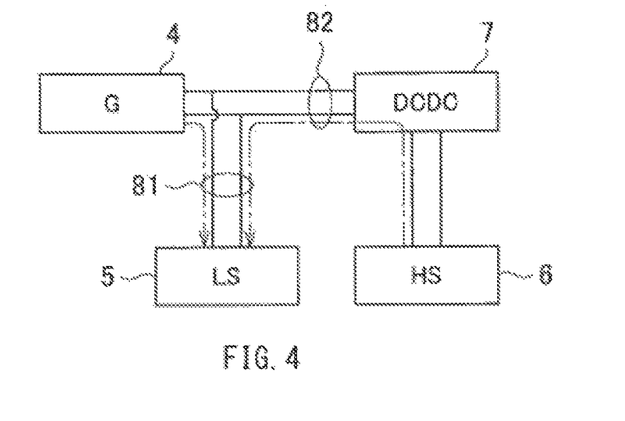
FIG. 4 is a diagram illustrating an exemplary operation of an electric power system for the vehicle according to one example embodiment of the technology during a step-down operation by a DC/DC converter.
Figure 5:
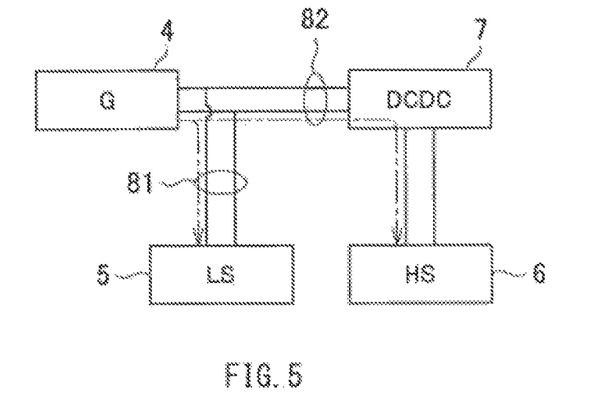
FIG. 5 is a diagram illustrating an exemplary operation of the electric power system for the vehicle according to one example embodiment of the technology during a step-up operation by the DC/DC converter.

An example operation of the electric power system 1 according to an embodiment will now be described with reference to FIGS. 4 and 5. In FIGS. 4 and 5, the directions of currents flowing in the first wiring line 81 and the second wiring line 82 during the control of the DC/DC converter 7 by the DC/DC converter controller 15 are indicated by chain line arrows. In this embodiment, for the purpose of illustration, the consumption current of the low-voltage system 5 acquired by the current acquiring unit 11 may be equal to an actual consumption current of the low-voltage system 5, and the target output current of the power generator 4 calculated by the target output current calculator 14 may be equal to an actual output current of the power generator 4.

When the target output current of the power generator 4 is smaller than the consumption current of the low-voltage system 5 (including a charging current to the low-voltage battery 50), the DC/DC converter 7 may be controlled to perform a step-down operation as illustrated in FIG. 4, so that the current outputted from the DC/DC converter 7 to the high-voltage system 6 takes a negative value. In other words, a current outputted from the DC/DC converter 7 to the low-voltage system 5 takes a positive value. The DC/DC converter 7 may be controlled to cause the difference obtained by subtracting the current outputted from the DC/DC converter 7 to the low-voltage system 5 from the consumption current of the low-voltage system 5 to become equal to the output current of the power generator 4. This control may cause electric power to be fed from the high-voltage system 6 to the low-voltage system 5. The electric power fed from the high-voltage system 6 to the low-voltage system 5 and the electric power generated by the power generator 4 may be used (e.g., consumed or stored) in the low-voltage system 5.

When the target output current of the power generator 4 is greater than the consumption current of the low-voltage system 5 (including a charging current to the low-voltage battery 50), the DC/DC converter 7 may be controlled to perform a step-up operation as illustrated in FIG. 5, so that the current outputted from the DC/DC converter 7 to the low-voltage system 5 takes a negative value. In other words, the current outputted from the DC/DC converter 7 to the high-voltage system 6 takes a positive value. The DC/DC converter 7 may be controlled to cause the sum of the consumption current of the low-voltage system 5 and the current outputted from the DC/DC converter 7 to the high-voltage system 6 to become equal to the output current of the power generator 4. This control may cause the electric power generated by the power generator 4 to be fed to the low-voltage system 5 and the high-voltage system 6. The electric power may be used (i.e., consumed or stored) in the low-voltage system 5 and the high-voltage system 6.

That is, the electric power generated by the power generator 4 may be constantly fed to the low-voltage system 5 through the first wiring line 81. This facilitates efficient use of electric power collected from exhaust heat for operating the low-voltage auxiliary device 51. Additionally, the output voltage of the power generator 4 may be kept at a constant value. This allows the low-voltage auxiliary device 51 to operate smoothly. In an example where the power generator 4 is an alternator, the output voltage of the power generator 4 may be readily kept at a constant value using a voltage regulator in the alternator. When the electric power generated by the power generator 4 is smaller than the consumption power of the low-voltage system 5, electric power may be fed from the high-voltage system 6 to the low-voltage system 5 via the DC/DC converter 7. This certainly causes the low-voltage auxiliary device 51 to operate. In contrast, when the electric power generated by the power generator 4 is greater than the consumption power of the low-voltage system 5, excess electric power at the low-voltage system 5 may be fed to the high-voltage system 6 via the DC/DC converter 7 and stored in the high-voltage battery 60, for example. This facilitates efficient use of electric power collected from exhaust heat in the electric power system 1 as a whole. In an alternative example, the power generator 4 may not be an alternator. In this example, the ECU 10 may be configured to control an output voltage of the power generator 4. For example, the ECU 10 may calculate a current value of a rotor coil in the power generator 4 for obtaining the target output voltage of the power generator 4, and may control the current of the rotor coil so as to achieve the calculated current value.

Example Effects

Example effects obtained by the configurations according to the foregoing embodiments will now be described.

The vehicle includes the engine 20 and the electric power system 1. The electric power system 1 includes the Rankine cycle 3, the power generator 4, the low-voltage system 5 including the low-voltage battery 50, the high-voltage system 6 including the high-voltage battery 60, the DC/DC converter 7, the first wiring line 81, and the second wiring line 82. The engine 20 may serve as the heating element. The Rankine cycle 3 and the power generator 4 may serve as the exhaust heat recovery apparatus that generates electric power on the basis of heat exhausted from the engine 20. The first wiring line 81 couples the power generator 4 and the low-voltage system 5. The second wiring line 82 couples the first wiring line 81 and the high-voltage system 6. The DC/DC converter 7 is disposed on the second wiring line 82 and configured to increase and decrease a voltage supplied to the DC/DC converter 7. Thus, in an example where the ECU 10 serves as the electric power control apparatus to control the DC/DC converter 7 in the electric power system 1, electric power may be transmitted between the low-voltage system 5 and the high-voltage system 6 while the output current from the power generator 4 is controlled by the transmission of the electric power. Accordingly, control of the electric power generation in the exhaust heat recovery apparatus (e.g., torque control of the rotary shaft of the power generator 4 through control of the output current) and control of the electric power transmission between the low-voltage system 5 and the high-voltage system 6 may be both achieved by the single DC/DC converter 7. In other words, a common electric converter in the single electric power system 1 may control the electric power generation in the exhaust heat recovery apparatus and transmit electric power between the low-voltage system 5 and the high-voltage system 6. Accordingly, it is possible to control electric power generation for collecting electric power from exhaust heat, to transmit electric power between the low-voltage system 5 and the high-voltage system 6, and to downsize the electric power system 1. For example, it is possible to achieve the electric power system 1 that efficiently collects electric power from exhaust heat by controlling electric power generation in the exhaust heat recovery apparatus, achieves efficient use of electric power by transmitting electric power between the low-voltage system 5 and the high-voltage system 6, requires a smaller number of components for downsizing of the electric power system 1, and thus saves the space in the vehicle.

The electric power generation in the exhaust heat recovery apparatus may be controlled by inputting and outputting a current to/from the high-voltage system 6. This facilitates efficient use of the energy of electric power generated by the exhaust heat recovery apparatus without wasting the energy. In general, an electric vehicle including a hybrid electric vehicle (HEV) is often originally provided with a DC/DC converter between a low-voltage system and a high-voltage system. The DC/DC converter is configured to at least increase a voltage supplied to the DC/DC converter. Accordingly, providing the DC/DC converter 7 according to the embodiment may not be accompanied by an additional increase in the number of components. In a case where a DC/DC converter bi-directionally operatable is originally disposed between the low-voltage system and the high-voltage system, the electric power system 1 according to the embodiment may be achieved by coupling the power generator of the exhaust heat recovery apparatus to the wiring that couples the DC/DC converter and the low-voltage system. Such a use of the original components of the vehicle makes it possible to readily achieve a simple configuration of the electric power system 1 that allows for the electric power generation control for collecting electric power from exhaust heat. Additionally, the ECU 10 that controls the DC/DC converter 7 may be an ECU originally provided to control the exhaust heat recovery apparatus. Alternatively, the ECU 10 may be an ECU originally provided to control the electric power transmission between the low-voltage system 5 and the high-voltage system 6. Still alternatively, the ECU 10 may be another ECU than those described above.

The ECU 10 serving as the electric power control apparatus may control the output current from the power generator 4 by controlling the DC/DC converter 7 so that the Rankine cycle 3 and the power generator 4 serving as the exhaust heat recovery apparatus generate electric power with high efficiency. In this case, the torque of the power generator 4 may be controlled by controlling the DC/DC converter 7 while electric power is transmitted between the low-voltage system 5 and the high-voltage system 6. This allows the exhaust heat recovery apparatus to operate at an operating point with higher efficiency, which results in higher efficiency in collecting electric power from exhaust heat. Accordingly, it is possible to improve the efficiency of the electric power system 1 as a whole.

The ECU 10 serving as the electric power control apparatus may control the DC/DC converter 7 to cause the sum of the consumption current of the low-voltage system 5 and the output current (having a positive or negative value) outputted from the DC/DC converter 7 to the high-voltage system 6 to become equal to the output current of the power generator 4. For example, the ECU 10 may control the DC/DC converter 7 to cause the value obtained by subtracting the output current (having a positive value) outputted from the DC/DC converter 7 to the low-voltage system 5 from the consumption current of the low-voltage system 5 to become equal to the output current of the power generator 4. In this case, controlling the DC/DC converter 7 makes it possible to transmit (input and output) electric power between the low-voltage system 5 and the high-voltage system 6 without wasting the output current of the power generator 4. Accordingly, it is possible to achieve efficient use of electric power without wasting the electric power.

The ECU 10 serving as the electric power control apparatus may acquire a consumption current of the low-voltage system 5, calculate a target output current of the power generator 4 on the basis of a target operating point of the Rankine cycle 3 serving as the exhaust heat recovery apparatus, and control the DC/DC converter 7 to cause the sum of the acquired consumption current of the low-voltage system 5 and the output current outputted from the DC/DC converter 7 to the high-voltage system 6 to become equal to the calculated target output current of the power generator 4. In this case, controlling the output current of the power generator 4 using the actually acquired consumption current of the low-voltage system 5 makes it possible to more certainly transmit electric power between the low-voltage system 5 and the high-voltage system 6, which results in efficient use of electric power without wasting the output current of the power generator 4.

The ECU 10 serving as the electric power control apparatus may acquire the consumption current of the low-voltage system through estimation. In this case, the use of the consumption current of the low-voltage system 5 acquired through the estimation allows for control of the output current of the power generator 4 without generating excess electric power or shortage of electric power.

The ECU 10 serving as the electric power control apparatus may calculate a target operating point of the Rankine cycle 3 serving as the exhaust heat recovery apparatus on the basis of the data on the amount of heat generated at the engine 20 serving as a heating element, and control an output current of the power generator 4 on the basis of the target operating point of the Rankine cycle 3. In this case, the use of the data on the amount of generated heat makes it possible to more certainly cause the exhaust heat recovery apparatus to operate at an operating point with higher efficiency, which results in an efficient electric power output.

The heating element may be the engine 20 serving as an internal combustion engine, and the data on the amount of heat generated at the engine 20 may be data on the temperature of the cooling water for the engine 20. In this case, the data on the amount of heat generated at the engine 20 may be readily acquired using the data on the temperature of the cooling water for the engine 20, and a highly efficient electric power output is achieved on the basis of the data. Alternatively, the data on the amount of heat generated at the engine 20 may be the load of the engine 20, such as the number of revolutions of the engine 20 or the torque of the engine 20. The heating element may be a fuel cell for a fuel-cell vehicle or a battery for an electric vehicle (EV). In an example where the heating element is a fuel cell, the data on the amount of heat generated at the fuel cell may be data on a current of the fuel cell or data on a detected temperature of the fuel cell, for example. In an example where the heating element is a battery for an electric vehicle (EV), the data on the amount of heat generated at the battery may be data on a current of the battery or data on a detected temperature of the battery, for example.

The exhaust heat recovery apparatus may include the Rankine cycle 3 that is a cycle in which a working medium undergoes a phase change and generate motive power for the power generator 4 on the basis of a flow of the working medium. The ECU 10 serving as the electric power control apparatus may calculate a target operating point of the Rankine cycle 3 on the basis of the data on the amount of the phase change of the working medium, and may control an output current of the power generator 4 on the basis of the target operating point of the Rankine cycle 3. In this case, the use of the cycle in which the working medium undergoes a phase change as the exhaust heat recovery apparatus makes it possible to efficiently convert heat exhausted from the heating element into motive power. Generating electric power using the motive power makes it possible to efficiently collect exhaust heat energy as electric power. Further, control based on the data on the amount of the phase change of the working medium makes it possible to certainly cause the exhaust heat recovery apparatus including the cycle to operate at an operating point with higher efficiency, which results in a high-efficiency electric power output. Note that the configuration of the Rankine cycle 3 should not be limited to that described in the foregoing embodiments and may be modified as appropriate. For example, the turbine of the expander 34 and the rotary shaft of the power generator 4 may be coupled to each other via an electromagnetic clutch that is controlled between an engagement state and a disengagement state on the basis of an instruction from the ECU 10, for example. Moreover, the cycle should not be limited to the Rankine cycle 3 described above, and may be the Stirling cycle, for example. Additionally, the exhaust heat recovery apparatus should not be limited to the above-mentioned cycle that generates motive power from exhaust heat, and may be any cycle that converts exhaust heat into electric power. For example, the exhaust heat recovery apparatus may include a thermoelectric device (or thermoelectric transducer) including a semiconductor or metal alloy.

The Rankine cycle 3 may include the condenser 35, and the data on the amount of the phase change of the working medium may include the external air temperature or the velocity of the airflow passing through the condenser 35 (e.g., vehicle speed). In this case, the amount of the phase change of the working medium at the condenser 35 for cooling the working medium may be readily detected or estimated on the basis of the external air temperature or the velocity of the airflow, which results in a highly efficient electric power output based on the data. Note that the data on the the amount of the phase change of the working medium should not be limited to the external air temperature and the velocity of the airflow passing through the condenser 35, and may be a parameter relevant to the operational state of the pump 32 that condenses the working medium (e.g., the number of revolution of the pump 32 or the discharge flow rate of the pump 32). In an example where the above-mentioned thermoelectric device is used as the exhaust heat recovery apparatus, the Rankine cycle controller 16 in the ECU 10 may be omitted.

One or both of the current acquiring unit 11, the data acquiring unit 12, the target operating point setting unit 13, the target output current calculator 14, and the DC/DC converter controller 15 in the electric power control apparatus illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the current acquiring unit 11, the data acquiring unit 12, the target operating point setting unit 13, the target output current calculator 14, and the DC/DC converter controller 15. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the current acquiring unit 11, the data acquiring unit 12, the target operating point setting unit 13, the target output current calculator 14, and the DC/DC converter controller 15 in the electric power control apparatus illustrated in FIG. 1.

Although some example configurations according to the embodiments of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the technology. The technology is intended to include such modifications and alterations in so far as they fall within the scope of the appended claims or the equivalents thereof.

The invention claimed is:

1. An electric power system for a vehicle, the system comprising:
    an exhaust heat recovery apparatus including a power generator, the power generator being configured to generate electric power on a basis of heat exhausted from a heating element;
    a low-voltage system including a low-voltage secondary battery;
    a high-voltage system including a high-voltage secondary battery, the high-voltage secondary battery being configured to output a voltage higher than the low-voltage secondary battery;
    a first wiring line coupling the power generator and the low-voltage system;
    a second wiring line coupling the first wiring line and the high-voltage system;
    a DC/DC converter disposed on the second wiring line and configured to increase and decrease a voltage supplied to the DC/DC converter; and
    a controller, wherein the exhaust heat recovery apparatus includes a cycle in which a working medium undergoes a phase change, and is configured to generate motive power for the power generator on a basis of a flow of the working medium, and wherein the controller is configured to calculate a target operating point of the exhaust heat recovery apparatus on a basis of data on an amount of the phase change of the working medium, and control the output current of the power generator on a basis of the target operating point of the exhaust heat recovery apparatus.

2. An electric power control apparatus for a vehicle, the vehicle comprising:

a heating element;

an exhaust heat recovery apparatus including a power generator, the power generator being configured to generate electric power on a basis of heat exhausted from the heating element;

a low-voltage system including a low-voltage secondary battery;

a high-voltage system including a high-voltage secondary battery, the high-voltage secondary battery being configured to output a voltage higher than the low-voltage secondary battery;

a first wiring line coupling the power generator and the low-voltage system;

a second wiring line coupling the first wiring line and the high-voltage system; and a DC/DC converter disposed on the second wiring line and configured to increase and decrease a voltage supplied to the DC/DC converter, wherein the electric power control apparatus is configured to control an output current of the power generator by controlling the DC/DC converter, wherein the exhaust heat recovery apparatus includes a cycle in which a working medium undergoes a phase change, and is configured to generate motive power for the power generator on a basis of a flow of the working medium, and wherein the electric power control apparatus is configured to calculate a target operating point of the exhaust heat recovery apparatus on a basis of data on an amount of the phase change of the working medium, and control the output current of the power generator on a basis of the target operating point of the exhaust heat recovery apparatus.

3. The electric power control apparatus according to claim 2, wherein the electric power control apparatus is configured to control the output current of the power generator by controlling the DC/DC converter to cause the exhaust heat recovery apparatus to generate electric power with higher efficiency.

4. The electric power control apparatus according to claim 2, wherein the electric power control apparatus is configured to control the DC/DC converter to cause a sum of a consumption current of the low-voltage system and an output current outputted from the DC/DC converter to the high-voltage system to become equal to the output current of the power generator.

5. The electric power control apparatus according to claim 3, wherein the electric power control apparatus is configured to control the DC/DC converter to cause a sum of a consumption current of the low-voltage system and an output current outputted from the DC/DC converter to the high-voltage system to become equal to the output current of the power generator.

6. The electric power control apparatus according to claim 2, wherein the electric power control apparatus is configured to acquire a consumption current of the low-voltage system, calculate a target output current of the power generator on a basis of a target operating point of the exhaust heat recovery apparatus, and control the DC/DC converter to cause a sum of the acquired consumption current of the low-voltage system and the output current outputted from the DC/DC converter to the high-voltage system to become equal to the calculated target output current of the power generator.

7. The electric power control apparatus according to claim 3, wherein the electric power control apparatus is configured to acquire a consumption current of the low-voltage system, calculate a target output current of the power generator on a basis of a target operating point of the exhaust heat recovery apparatus, and control the DC/DC converter to cause a sum of the acquired consumption current of the low-voltage system and the output current outputted from the DC/DC converter to the high-voltage system to become equal to the calculated target output current of the power generator.

8. The electric power control apparatus according claim 6, wherein the electric power control apparatus is configured to acquire the consumption current of the low-voltage system through estimation.

9. The electric power control apparatus according claim 7, wherein the electric power control apparatus is configured to acquire the consumption current of the low-voltage system through estimation.

10. The electric power control apparatus according to claim 2, wherein the electric power control apparatus is configured to calculate a target operating point of the exhaust heat recovery apparatus on a basis of data on an amount of heat generated at the heating element, and control the output current of the power generator on a basis of the target operating point of the exhaust heat recovery apparatus.

11. The electric power control apparatus according to claim 3, wherein the electric power control apparatus is configured to calculate a target operating point of the exhaust heat recovery apparatus on a basis of data on an amount of heat generated at the heating element, and control the output current of the power generator on a basis of the target operating point of the exhaust heat recovery apparatus.

12. The electric power control apparatus according to claim 10, wherein the heating element comprises an internal combustion engine, and the data on the amount of heat generated at the heating element comprises a temperature of cooling water for the internal combustion engine.

13. The electric power control apparatus according to claim 11, wherein the heating element comprises an internal combustion engine, and the data on the amount of heat generated at the heating element comprises a temperature of cooling water for the internal combustion engine.

14. The electric power control apparatus according to claim 2, wherein
the cycle includes a condenser, and
the data on the amount of the phase change of the working medium includes an external air temperature or a velocity of an airflow passing through the condenser.

15. A method of controlling electric power of a vehicle, the method comprising:
preparing the vehicle that includes
a heating element,
an exhaust heat recovery apparatus including a power generator, the power generator being configured to generate electric power on a basis of heat exhausted from the heating element,
a low-voltage system including a low-voltage secondary battery;
a high-voltage system including a high-voltage secondary battery, the high-voltage secondary battery being configured to output a voltage higher than the low-voltage secondary battery,
a first wiring line coupling the power generator and the low-voltage system,
a second wiring line coupling the first wiring line and the high-voltage system, and
a DC/DC converter disposed on the second wiring line and configured to increase and decrease a voltage supplied to the DC/DC converter; and
controlling, with an electric power control apparatus for the vehicle, an output current of the power generator by controlling the DC/DC converter;
generating motive power for the power generator on a basis of a flow of a working medium, wherein the electric power control apparatus includes a cycle in which the working medium undergoes a phase change;
calculating a target operating point of the exhaust heat recovery apparatus on a basis of data on an amount of the phase change of the working medium; and
controlling the output current of the power generator on a basis of the target operating point of the exhaust heat recovery apparatus.

16. A non-transitory computer-readable recording medium containing a program, the program causing, when executed by a computer, the computer to implement a method of controlling electric power of a vehicle, the vehicle comprising:
a heating element;
an exhaust heat recovery apparatus including a power generator, the power generator being configured to generate electric power on a basis of heat exhausted from the heating element;
a low-voltage system including a low-voltage secondary battery;
a high-voltage system including a high-voltage secondary battery, the high-voltage secondary battery being configured to output a voltage higher than the low-voltage secondary battery;
a first wiring line coupling the power generator and the low-voltage system;
a second wiring line coupling the first wiring line and the high-voltage system; and
a DC/DC converter disposed on the second wiring line and configured to increase and decrease a voltage supplied to the DC/DC converter, the method comprising:
controlling, with an electric power control apparatus for the vehicle, an output current of the power generator by controlling the DC/DC converter;
generating motive power for the power generator on a basis of a flow of a working medium, wherein the electric power control apparatus includes a cycle in which the working medium undergoes a phase change;
calculating a target operating point of the exhaust heat recovery apparatus on a basis of data on an amount of the phase change of the working medium; and
controlling the output current of the power generator on a basis of the target operating point of the exhaust heat recovery apparatus.

17. An electric power control apparatus for a vehicle, the vehicle comprising:
a heating element;
an exhaust heat recovery apparatus including a power generator, the power generator being configured to generate electric power on a basis of heat exhausted from the heating element;
a low-voltage system including a low-voltage secondary battery;
a high-voltage system including a high-voltage secondary battery, the high-voltage secondary battery being configured to output a voltage higher than the low-voltage secondary battery;
a first wiring line coupling the power generator and the low-voltage system;
a second wiring line coupling the first wiring line and the high-voltage system; and
a DC/DC converter disposed on the second wiring line and configured to increase and decrease a voltage supplied to the DC/DC converter,
the electric power control apparatus comprising circuitry configured to:
control an output current of the power generator by controlling the DC/DC converter;
generate motive power for the power generator on a basis of a flow of a working medium, wherein the electric power control apparatus includes a cycle in which the working medium undergoes a phase change;
calculate a target operating point of the exhaust heat recovery apparatus on a basis of data on an amount of the phase change of the working medium; and
control the output current of the power generator on a basis of the target operating point of the exhaust heat recovery apparatus.

* * * * *